United States Patent [19]

Akita et al.

[11] Patent Number: 4,673,913
[45] Date of Patent: Jun. 16, 1987

[54] ZIGZAG RUNNING WARNING SYSTEM FOR AUTOMOTIVE VEHICLES

[75] Inventors: Shigeyuki Akita, Okazaki; Yoshiyuki Kago, Aichi, both of Japan

[73] Assignee: Nippon Soken, Inc., Nishio, Japan

[21] Appl. No.: 418,529

[22] Filed: Sep. 15, 1982

[30] Foreign Application Priority Data

Oct. 28, 1981 [JP] Japan .................... 56-173377

[51] Int. Cl.[4] .................. B60Q 1/00; G01C 17/28
[52] U.S. Cl. .................... 340/52 R; 33/361; 324/207; 324/253
[58] Field of Search .......... 340/52 R–54, 340/575, 576, 815.23, 941; 180/167, 168; 33/361; 324/207, 208, 251–254

[56] References Cited

U.S. PATENT DOCUMENTS

| | | | |
|---|---|---|---|
| 3,959,889 | 6/1976 | Thomas | 33/361 |
| 4,030,204 | 6/1977 | Edwards | 33/361 |
| 4,104,803 | 8/1978 | Hoeppel | 33/361 |
| 4,339,713 | 7/1982 | Kago et al. | |
| 4,379,366 | 4/1983 | Kuno et al. | 33/361 |

FOREIGN PATENT DOCUMENTS 156810 12/1980 Japan .

Primary Examiner—John W. Caldwell, Sr.
Assistant Examiner—Tyrone Queen
Attorney, Agent, or Firm—Cushman, Darby & Cushman

[57] ABSTRACT

In a zigzag running warning system for automotive vehicles which detects and gives a warning of zigzag running of a vehicle, a terrestrial magnetism sensor generates an electric signal having an amplitude varying in dependence on the direction of travel of the vehicle with respect to the direction of the terrestrial magnetism. An electronic unit in the system discriminates that vehicle is running in a zigzag direction when the amplitude of the electric signals changes in excess of a predetermined value at a period which is less than a predetermined time, and informs the driver of the zigzag running by a speaker, lamp or the like.

3 Claims, 3 Drawing Figures

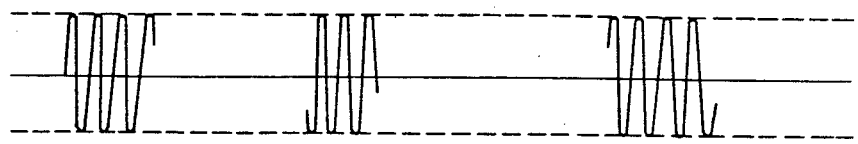
FIG. 3 (a)
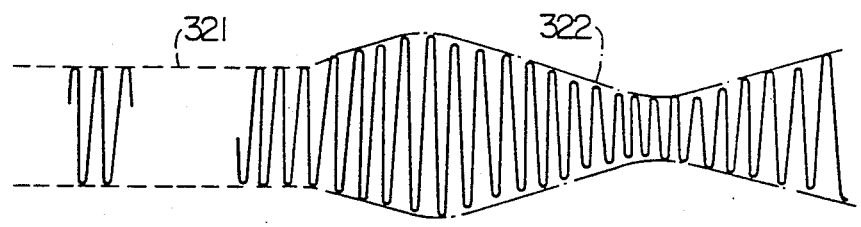
FIG. 3 (b)
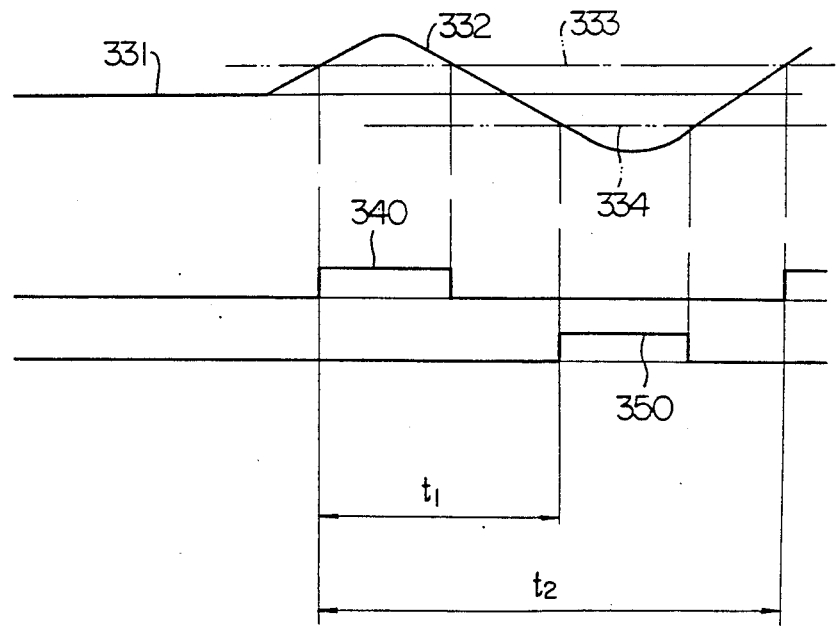
FIG. 3 (c)
FIG. 3 (d)

ZIGZAG RUNNING WARNING SYSTEM FOR AUTOMOTIVE VEHICLES

BACKGROUND OF THE INVENTION

The present invention relates to a zigzag running warning system for automotive vehicles which detects zigzag running of a vehicle to give a warning thereof.

During the running of a vehicle, if the side wind, for example, blows against the vehicle, the vehicle is drifted by the pressure of the wind and the driver tries to return the vehicle to the original running condition. Then, since the wind is not blowing at a constant velocity, the vehicle runs in a zigzag direction. Also, it is considered that if the driver becomes drowsy, the vehicle is caused to run in a zigzag direction. On the other hand, it is believed that during the running of a vehicle the magnitude of the terrestrial magnetism will not vary considerably and its direction also remains the same over a short distance of travel.

SUMMARY OF THE INVENTION

With a view to overcoming the foregoing deficiencies in the prior art, it is the primary object of the invention to provide a zigzag running warning system for automobiles comprising terrestrial magnetism detection means for detecting the direction of the terrestrial magnetism with respect to the direction of travel of a vehicle and generating an electric signal corresponding to the detection, a discrimination processing circuit responsive to the electric signals from the terrestrial magnetism detecting means for discriminating the zigzag running of the vehicle when the direction of the terrestrial magnetism with respect to the vehicle's travel direction is changed alternately with time, and warning means responsive to a warning signal from the discrimination processing circuit to give a warning against the zigzag running condition, thereby making it possible to detect the occurrence of a zigzag running condition in terms of changes in the terrestrial magnetism and give a warning against the zigzag running.

Thus, in accordance with the invention, by virtue of the fact that the direction of the terrestrial magnetism with respect to the direction of travel of a vehicle is detected by terrestrial magnetism detecting means so that in accordance with the electric signals generated from the terrestrial magnetism detecting means in response to the zigzag running of the vehicle the zigzag running condition is discriminated and the driver is informed of the zigzag running by a warning, if the cause of the zigzag running is the side wind, for example, the driver is allowed to confirm the warning against the zigzag running and take a necessary measure such as running the vehicle at such a reduced speed which eliminates the effect of the wind or turning the steering wheel with caution or taking such a measure as a rest to shake off sleepiness if the cause of the zigzag running is the driver's drowsiness, thereby allowing the driver to know the dangerous running condition and try to drive the vehicle safely.

BRIEF DESCRIPTION OF THE DRAWINGS

FIG. 3 shows a plurality of waveforms useful for explaining the operation of the system.

DESCRIPTION OF THE PREFERRED EMBODIMENTS

The invention will now be described in greater detail with reference to the illustrated embodiment.

Figure 1:
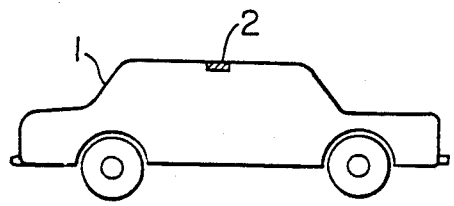
FIG. 1 is a schematic diagram showing the position at which a system of the present invention is attached to a vehicle.
Figure 2:
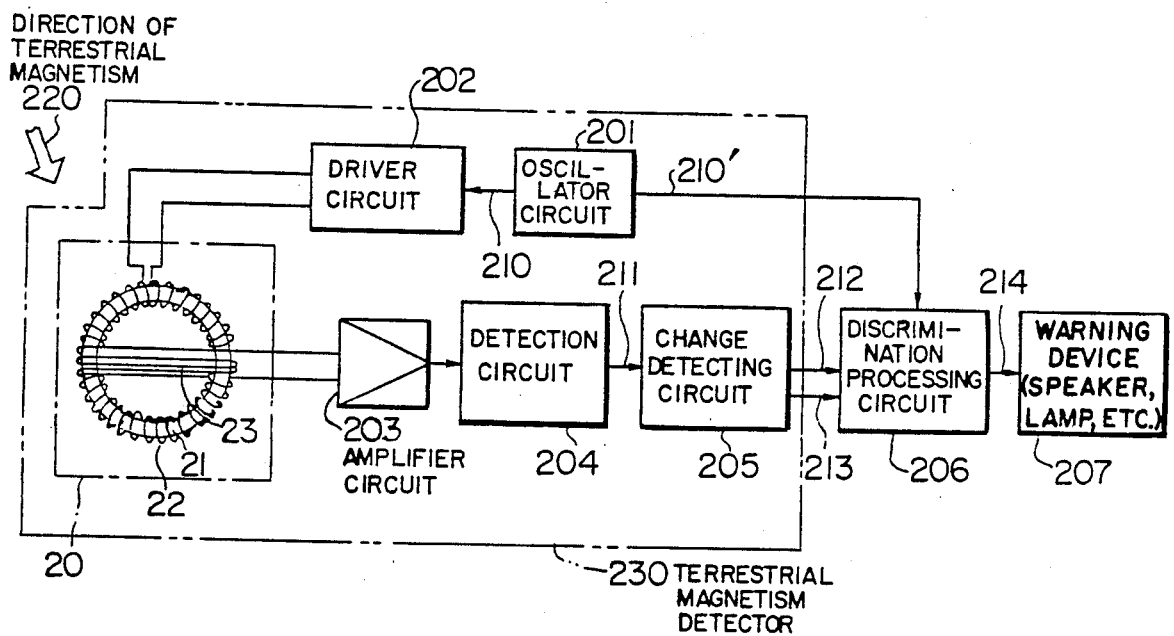
FIG. 2 is a wiring diagram for an embodiment of the system according to the invention.

Referring to FIG. 1 illustrating a schematic diagram of an automobile, in the illustrated embodiment a magnetic sensor 2 for detecting the terrestrial magnetism is disposed in the roof of the vehicle. The construction of the magnetic sensor 2 is shown in FIG. 2. In the Figure, numeral 20 designates a terrestrial magnetism detecting magnetic sensor (disposed in the horizontal direction of the vehicle) and the magnetic sensor 20 comprises an annular core 21, an excitation coil 22 wound uniformly on the core 21 and a sensing coil 23. Numeral 202 designates a driver circuit for receiving the signal from an oscillator circuit 201 which oscillates at a given frequency and driving the excitation coil 22 of the magnetic sensor 20, 203 an amplifier circuit for amplifying the signal produced in the sensing coil 23, 204 a detection circuit, 205 a change detecting circuit responsive to the output signal of the detection circuit 204 for detecting whether the direction of the vehicle is changed in excess of a predetermined value, and 206 a discrimination processing circuit responsive to the signals from the oscillator circuit 201 and the change detecting circuit 205 for determining whether the vehicle is zigzagging. Numeral 220 shows an example of the direction of the terrestrial magnetism. The component elements 20 and 201 to 206 form terrestrial magnetism detecting means 230 for detecting the direction of the terrestrial magnetism with respect to the direction of travel of the vehicle and generating an electric signal corresponding to the detection thereof.

With the construction described above, the operation of the embodiment will now be described with reference to the voltage waveforms shown in FIG. 3.

Shown in (a) of FIG. 3 is the output signal of the oscillator circuit 201 of FIG. 2 and it appears on lines 210 and 210', respectively. The signal appearing on the line 210 is applied to the excitation coil 22 of the magentic sensor 20 through the driver circuit 202. As a result, a drive field is produced in the annular core 21 of the magnetic sensor 20. In this case, while no signal is produced in the sensing coil 23 if the magnetic sensor 20 is not placed in any magnetic field, upon application of the terrestrial magnetism a signal proportional to a superposition of the drive field and the intensity of the terrestrial magnetism (the direction of the terrestrial magnetism) is generated in the sensing coil 23 as shown at 321 in (b) of FIG. 3.

Assuming now that the vehicle zigzags, the direction of the terrestrial magnetism applied to the magnetic sensor 20 is changed. In other words, the intensity of the magnetic field passing through the annular core 21 changes and a signal is generated whose amplitude changes in dependence on the intensity of the terrestrial magnetism as shown at 322 in (b) of FIG. 3.

More specifically, while the signal amplitude remains constant as shown at 321 in (b) of FIG. 3 when the vehicle is running in a fixed direction, if the vehicle runs in a zigzag direction the sensing coil 23 generates a signal which is amplitude modulated as shown at 322 in (b) of FIG. 3.

The signal from the sensing coil 23 is amplified by the amplifier circuit 203 and then subjected to envelope detection by the detection circuit 204, thereby generating the waveform shown in (c) of FIG. 3 on an output line 211 of the detection circuit 204. The signal in (c) of FIG. 3 is introduced to the change detecting circuit 205. The change detecting circuit 205 generates the pulse signal shown at 340 in (d) of FIG. 3 when the waveforms 331 and 332 are higher than predetermined voltages (333 and 334 in (c) of FIG. 3) and the pulse signal shown at 350 shown in (d) of FIG. 3 when the reverse is the case on lines 212 and 213, respectively, of FIG. 2. Then, the discrimination processing circuit 206 measures the periods of the pulse signals ($t_1$ and $t_2$ in FIG. 3) on the basis of the signals (line 210') from the oscillator circuit 201, and determines that the vehicle is running in zigzag fashion by detecting that the periods of the pulse signals are each within a predetermined time (it is also possible to determine that the vehicle is running in zigzag fashion by detecting that the state that the pulse signals occur with the predetermined periods continues) thereby generating an output signal on a line 214 of FIG. 2. This output signal operates a warning device 207 comprising a speaker, lamp or the like and the driver is informed of the zigzag running by means of a voice or visual indication.

While, in the above-described embodiment, the magnetic sensor 20 is disposed in the roof of the vehicle, its position is not limited thereto and it may be mounted in any part of the vehicle.

Further, while, the signals subjected to envelope detection are discriminated in accordance with the two differently-valued predetermined voltages, it is possible to use only a single-valued predetermined voltage such as shown at 333 or 334 in FIG. 3 or alternatively three or more differently-valued predetermined voltages may be used.

Still further, while, in the above-described embodiment, the annular core 21 is used as the core of the magnetic sensor 20, the invention is not limited thereto and the core may be formed into a bar shape. Also, the magnetic sensor may be of any other type employing a Hall generator or the like.

We claim:

1. A zigzag running warning system for an automotive vehicle, comprising:
   a magnetic sensor having an annular core, an excitation coil wound uniformly on said annular core, and a sensing coil wound to traverse said annular core;
   an oscillator circuit for oscillating at a given frequency;
   a driver circuit for receiving oscillations from said oscillator circuit and driving said excitation coil in response thereto;
   an amplifier circuit for amplifying an output signal of said sensing coil which varies in amplitude in response to the superposition of terrestrial magnetism and magnetism produced by said excitation coil whenever it is driven by said driver circuit;
   a detection circuit for envelope detecting an output signal of said amplifier circuit;
   a change detecting circuit for generating an electric signal as a signal indicating that the direction of travel of said vehicle is changed in excess of a predetermined value when an output signal of said detection circuit is higher than a predetermined value;
   an electronic unit responsive to said electric signal from said change detecting circuit to discriminate zigzag running of said vehicle as a condition existing when the direction of the terrestrial magnetism with respect to the direction of travel of said vehicle changes alternately with time, and to generate a warning signal when said zigzag running is discriminated; and
   warning means responsive to a warning signal from said electronic unit for issuing a warning against said zigzag running condition.

2. A system according to claim 1, wherein said electronic unit discriminates that said vehicle is running in a zigzag direction by detecting also whether a period of said electric signal is less than a predetermined time.

3. A system according to claim 1, wherein said electronic unit discriminates that said vehicle is running in a zigzag direction when said electric signal is generated successively at a period less than a predetermined time.

* * * * *